United States Patent [19]

Rauch

[11] Patent Number: 5,246,307
[45] Date of Patent: Sep. 21, 1993

[54] SUBMERGED BREAKWATER AND BARRIER REEF

[76] Inventor: Hans G. Rauch, 426 Wayman Cir., West Palm Beach, Fla. 33406

[21] Appl. No.: 893,444

[22] Filed: Jun. 4, 1992

Related U.S. Application Data

[63] Continuation-in-part of Ser. No. 576,598, Aug. 31, 1990, Pat. No. 5,120,156.

[51] Int. Cl.⁵ .............................................. E02B 3/06
[52] U.S. Cl. ........................................ 405/25; 405/30
[58] Field of Search ..................... 405/16, 17, 21, 23, 405/25, 30, 31, 34, 35, 115, 116, 117

[56] References Cited

U.S. PATENT DOCUMENTS

| | | | |
|---|---|---|---|
| 2,344,302 | 3/1944 | Harza | 405/16 |
| 3,379,017 | 4/1968 | Kusatake | 405/31 |
| 4,502,816 | 3/1985 | Creter, Jr. et al. | 405/25 X |
| 4,978,247 | 12/1990 | Lenson | 405/21 X |
| 5,102,257 | 4/1992 | Creter | 405/25 |
| 5,120,156 | 6/1992 | Rauch | 405/25 |

FOREIGN PATENT DOCUMENTS

| | | | |
|---|---|---|---|
| 33317 | 2/1989 | Japan | 405/16 |
| 294516 | 4/1965 | Netherlands | 405/16 |
| 300238 | 9/1965 | Netherlands | 405/16 |
| 559289 | 2/1975 | Switzerland | 405/30 |
| 746161 | 3/1956 | United Kingdom | 405/16 |
| 795349 | 5/1958 | United Kingdom | 405/16 |
| 1199856 | 7/1970 | United Kingdom | 405/30 |

*Primary Examiner*—David H. Corbin
*Assistant Examiner*—Arlen L. Olsen
*Attorney, Agent, or Firm*—Malin, Haley, DiMaggio & Crosby

[57] ABSTRACT

A submerged breakwater and barrier reef module, the reef being placed upon the seabed for protecting shorelines from the deleterious effects of wave energy including beach erosion.

The module is comprised of a base, having a bottom surface and securing the module to the seabed. The base supports a seaward face for initially receiving an oncoming wave and partially dissipating the wave energy. The seaward face includes a plurality of depressions, and these depressions control scouring about the module.

4 Claims, 2 Drawing Sheets

SUBMERGED BREAKWATER AND BARRIER REEF

This application is a continuation-in-part of Ser. No. 07/576,598 filed on Aug. 31, 1990, now U.S. Pat. No. 5,120,156 for a Submerged Breakwater and Barrier Reef. The '598 application is currently pending, and has been allowed.

BACKGROUND OF THE INVENTION

1. Field of the Invention

This invention relates to an improved submerged breakwater and barrier reef designed to prevent shoreline deterioration and beach erosion in coastal areas. The instant invention is an improvement over the breakwater module disclosed in the patent application Ser. No. 07/576,598, now U.S. Pat. No. 5,120,598, the disclosure of which is hereby incorporated by reference. The '598 specification, at pages 6 through 13, describes in detail the general construction and operation of the reef modules, and its design specifications. The instant invention adds the improvement of a plurality of depressions which are placed on the surface of the concave, seaward face, to eliminate the deleterious effects of scouring which occurs about the reef.

2. Description of Related Art

Numerous patents relate to shoreline breakwaters and/or erosion prevention devices. The most relevant disclosure relating to the instant invention is set forth in the incorporated application Ser. No. 07/576,598, now U.S. Pat. No. 5,120,156 and U.S. Pat. No. 4,818,141 ('141 Patent) which discloses a prefabricated erosion prevention device. The '141 Patent issued to Hans G. Rauch, inventor of the improved barrier reef disclosed in this application. It was a result of further research and testing to control scouring which lead to the development of this invention.

Other shoreline breakwaters can be found in a variety of configurations. For example, Hubbard U.S. Pat. No. 4,407,608; Weir U.S. Pat. No. 4,498,805; Schaaf et al. U.S. Pat. No. 4,367,978; Schaaf et al. U.S. Pat. No. 4,711,598; and Creter U.S. Pat. No. 4,502,816 all disclose devices for controlling beach erosion or coastal problems. None of these devices have withstood the test of time, nor have they proven to be effective solutions.

It is therefore highly desirable to provide an improved submerged breakwater and barrier reef exhibiting optimal performance characteristics in the prevention of scouring caused by wave energy.

It is also highly desirable to provide an improved submerged breakwater and barrier reef which incorporates a mechanism to prevent scouring which is cost effective yet operationally efficient.

Finally, it is highly desirable to provide an improved submerged breakwater and barrier reef which incorporates all of the above-mentioned features.

SUMMARY OF THE INVENTION

Briefly, what is provided is an improved breakwater module which has a plurality of depressions, placed in a particular pattern, about its concave seaward face, to address the problem of scouring which occurs about the module, and help prevent this phenomenon from occurring. The depressions are generally in the shape of a horseshoe, and are placed on the seaward surface of the reef in series.

In accordance with these and other objects which will become apparent hereinafter, the instant invention will now be described with particular reference to the accompanying drawings.

DETAILED DESCRIPTION OF THE PREFERRED EMBODIMENTS

Patent application Ser. No. 07/576,598, now U.S. Pat. No. 5,120,156, has been incorporated into the instant application. The '598 application discloses the general construction and operation of the submerged breakwater and barrier reef modules, and discusses the dissipation and deflection of wave forces which encounter the modules. The instant invention generally comprises an improvement of the barrier reef modules 10, as shown in FIG. 1.

The placement of structures on the ocean floor near the beach frequently induces morphological changes around the structures. The erosion at the toe of a coastal device is termed "scouring," which is similar to that found in front of seawalls or similar devices. With respect to coastal structures, waves and wave energy are the main factors affecting the scouring pattern, depth and location. In the environment of submerged breakwaters, scouring can occur in or about the perimeter of the modules, and presents a significant long term problem which affects the stability of the reef. The amount or the timetable for scouring depends on a variety of factors, including the physical parameters of the sand granules, structure slope, wave deflection, wave height and wave depth. It also depends upon the shape and design specifications of a particular breakwater, and how the breakwater will diminish the wave forces encountering the reef. By diminishing scouring, or preventing its occurrence, one increases the stability of the breakwater. This also has the effect of further preventing beach and coastal erosion over time.

Figure 1:
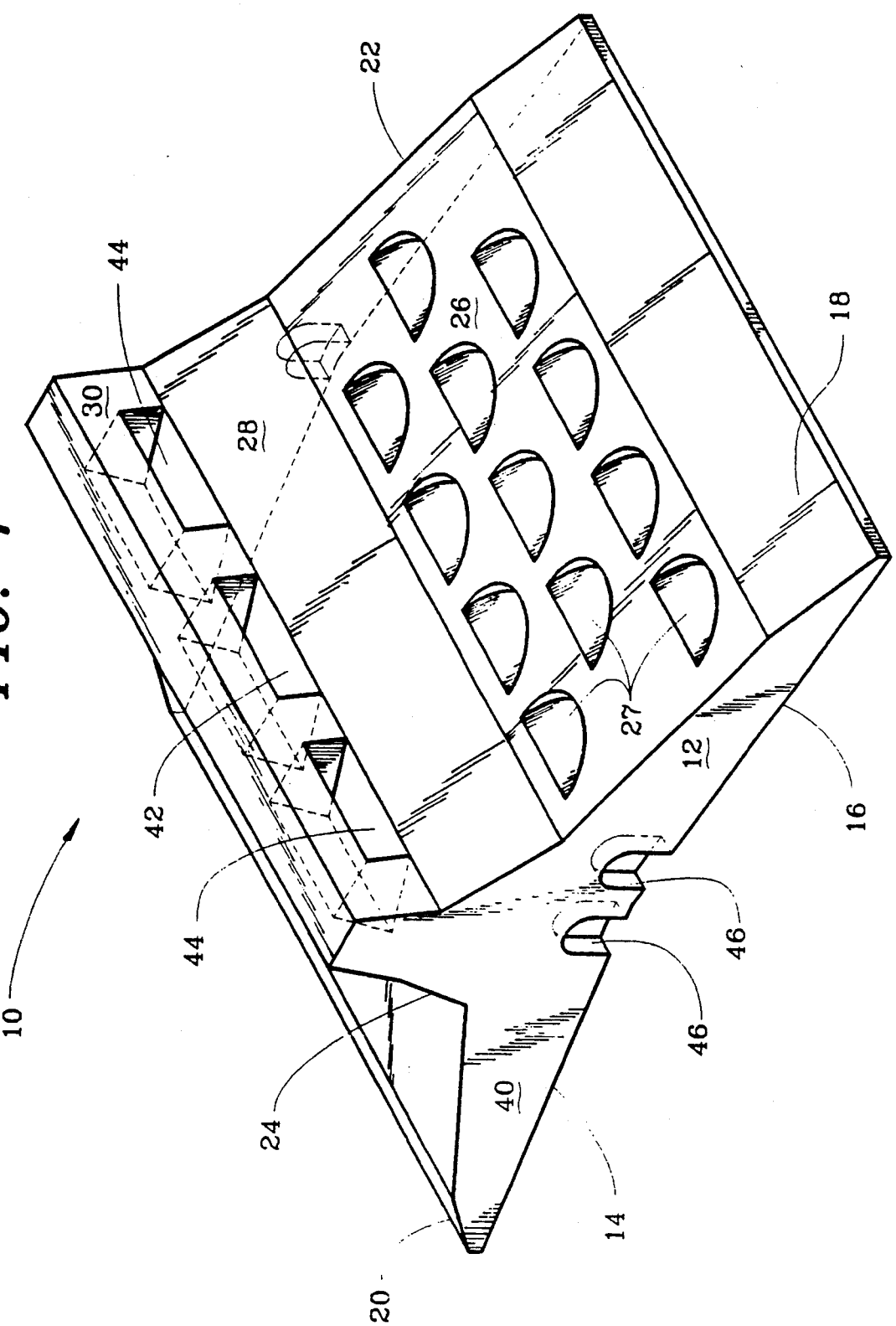
FIG. 1 is a perspective view of a reef module generally illustrating its seaward face.
Figure 2:
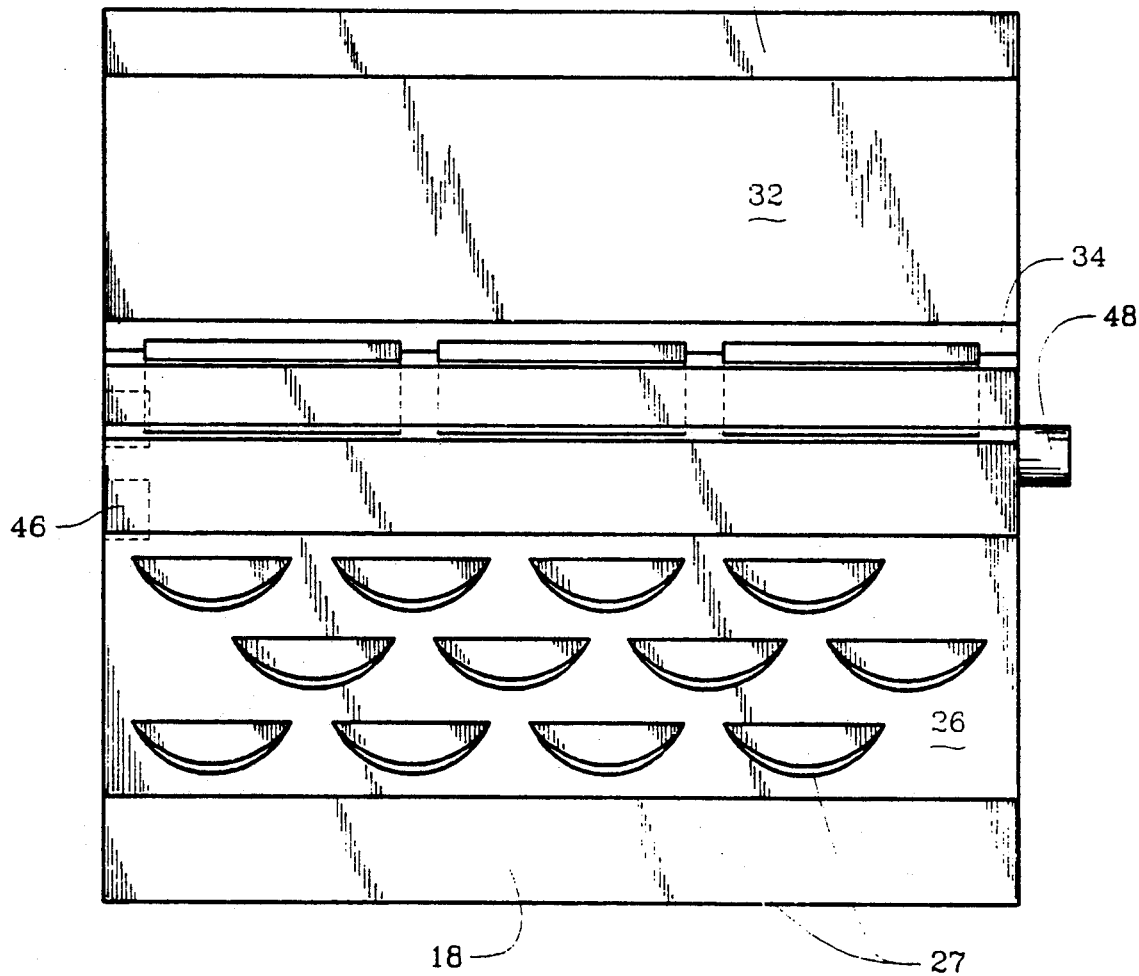
FIG. 2 is a top plan view of the reef module.
Figure 3:
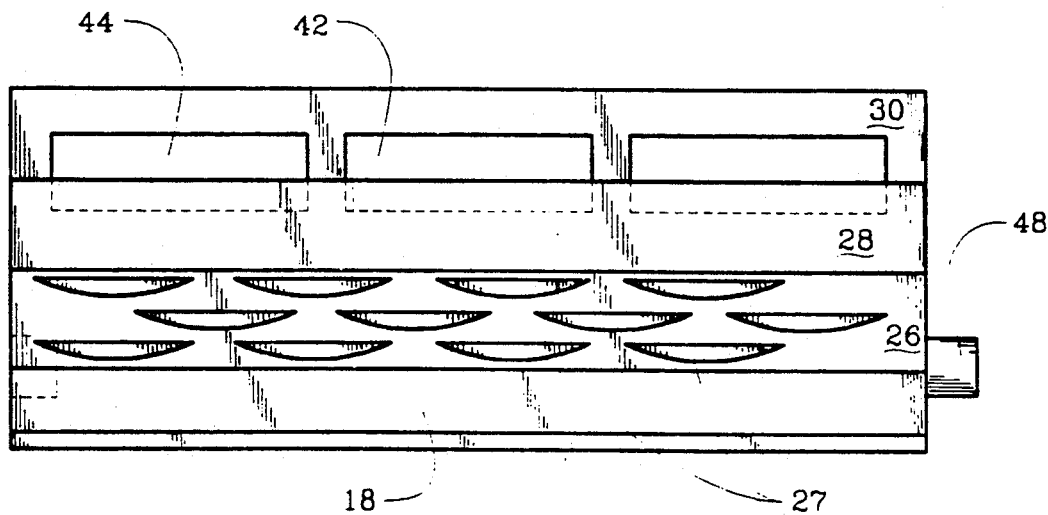
FIG. 3 is a front elevational view of the barrier reef illustrated in FIG. 1 and FIG. 2.

The instant invention incorporates a plurality of depressions 27, as shown best in FIG. 1. They are illustrated generally in the shape of horseshoes, and the pattern can be a series of such voids placed about the concave seaward face of the module.

Wave deflection about a coastal structure is a function of the structure's shape and slope, incident wave parameters and local energy dissipation mechanisms. For a particular geometric shape without artificial dissipation mechanisms, the deflection of wave energy will have particular characteristics which are quantifiable by mathematical equations. It can be found that a partial reduction of wave reflection, and favorable effect of dissipating wave energy, can be achieved by adding certain mechanisms, such as rough surfaces or barriers, on the seaward face of the reef module. In the instant invention, the horseshoe depressions 27 have been found to be particularly effective in the prevention and/or control of scouring. The depressions act to precipitate sediment and further assist in countering wave forces. This pattern has been found to be effective in enhancing accretion about the module.

Modifications to the instant invention shall be incorporated to account for particular changes in the coastal environment and beach conditions. However, while there have been described above the principles of this invention in connection with specific apparatus, it is to be clearly understood that this description is made only by way of example, and not as a limitation to the scope of the invention.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A submerged breakwater and barrier reef module, said reef being placed upon the seabed for protecting shorelines from the deleterious effects of wave energy including beach erosion, comprising:

a base having a bottom surface for securing said module to said seabed;

said base supporting a generally crescent shaped, concave seaward face and a generally crescent shaped, concave beachward face, said seaward face and beachward face being diametrically positioned;

said seaward face for initially receiving an oncoming wave and partially dissipating said wave energy;

said base, seaward face and beachward face being integrally associated, said module constituting a unitary device, said concave seaward face including a plurality of depressions, said depressions being generally in the shape of horseshoes, whereby said depressions control scouring about said module.

2. The apparatus of claim 1, further comprising channel means for providing a controlled passage through which a portion of said wave may travel, said channel means interposed said seaward face and said beachward face, wherein said channel means comprises a plurality of discrete cavities, each said cavity having an inlet at said seaward face and an outlet at said beachward face, said cavities expanding toward said outlet.

3. The apparatus of claim 1, further comprising:

interlocking means for securely connecting one said module to another in forming said reef.

4. The apparatus of claim 3, wherein said interlocking means comprises a plurality of female members formed within said base on one side of said module, and at least one male member protruding from said base on the opposite side of said module; the female member of one module capable of interlocking with the male member of another said module.

* * * * *